US007711995B1

(12) United States Patent
Morris

(10) Patent No.: US 7,711,995 B1
(45) Date of Patent: *May 4, 2010

(54) METHOD AND SYSTEM FOR DIGITAL PRESERVATION HAVING LONG TERM ERROR-FREE STORAGE, RETRIEVAL, AND INTERPRETATION OF DIGITAL FILES

(76) Inventor: Alan Morris, 4550 N. Park Ave., #104, Chevy Chase, MD (US) 20815

( * ) Notice: Subject to any disclaimer, the term of this patent is extended or adjusted under 35 U.S.C. 154(b) by 900 days.

This patent is subject to a terminal disclaimer.

(21) Appl. No.: 11/493,565

(22) Filed: Jul. 27, 2006

Related U.S. Application Data

(63) Continuation-in-part of application No. 11/473,069, filed on Jun. 23, 2006.

(51) Int. Cl.
*G06F 12/16* (2006.01)
(52) U.S. Cl. .................. 714/54; 714/42; 714/47; 711/161; 711/162
(58) Field of Classification Search .......... 711/162, 711/156, 161; 707/204; 714/42, 54
See application file for complete search history.

(56) References Cited

U.S. PATENT DOCUMENTS

| 5,615,335 | A | * | 3/1997 | Onffroy et al. .................. 714/30 |
| 5,917,724 | A | * | 6/1999 | Brousseau et al. ............ 700/81 |
| 6,606,693 | B1 | | 8/2003 | Morris |
| 6,691,309 | B1 | | 2/2004 | Lorie |
| 7,035,468 | B2 | | 4/2006 | Yogeshwar et al. |
| 7,069,278 | B2 | * | 6/2006 | Telkowski et al. ........... 707/204 |
| 7,304,816 | B2 | * | 12/2007 | Johnson et al. ................ 360/31 |
| 2003/0090531 | A1 | * | 5/2003 | Wong et al. ..................... 347/1 |
| 2005/0068976 | A1 | * | 3/2005 | Maeda et al. ................ 370/428 |
| 2006/0010177 | A1 | * | 1/2006 | Kodama ..................... 707/204 |
| 2006/0123232 | A1 | * | 6/2006 | Cannon et al. ............. 713/165 |
| 2006/0271740 | A1 | * | 11/2006 | Mark et al. .................. 711/137 |
| 2007/0180337 | A1 | * | 8/2007 | Courtney ..................... 714/54 |

OTHER PUBLICATIONS

R.J. Longman, "Monitoring of Optical Media Archives", COSA Nov. 18, 2004; Dec. 6, 2004, 4 pgs.
Phil Mellor, et al., "Migration on Request, A Practical Technique for Preservation", ECDL 2002, 9 pgs.
Raymond Lorie, "A Project on Preservation of Digital Data", RLG DigiNews, pp. 9-16, vol. 5, No. 3, http://www.rlg.org/legacy/preserv/diginews/diginews5-3.html, Jun. 15, 2001, ISSN 1093-5371.

(Continued)

*Primary Examiner*—Scott Baderman
*Assistant Examiner*—Chae Ko
(74) *Attorney, Agent, or Firm*—Blank Rome LLP

(57) ABSTRACT

Digital preservation is realized in this invention by providing a method and system for long term error-free storage, having means for requested files to be retrieved error-free from the storage, and having means for interpretation of the retrieved files, for all the time span that the storage continues on. User-requested files, when retrieved from the long term error-free digital storage, are retrieved without possibility of corruption of the files of the storage. The storage of the files is continued on in time, by being forward copied, error-free, from one-era storage media to next-era storage media. Planning for the timing of forward copy from the one-era media is accomplished by methods for contemporaneous determination of the actual lifetime of the one-era media, through monitoring scans of the written-to media.

19 Claims, 3 Drawing Sheets

OTHER PUBLICATIONS http://www.microsoft.com/office/xml/ecmaletter.mspcx?pf=true., "Announcing Submission of Office 12" XML Formats to Ecma International for Standardization, published Nov. 22, 2005, 3 pgs.

H.M. Gladney, Perspectives on Trustworthy Information, Digital Preservation, Digital Document Quarterly, 14 pages, vol. 5, No. 2, 2Q2006, http://home.pacbell.net/hgladney/ddg_5_2.htm, Saratoga, CA.

H. M. Gladney, Perspectives on Trustworthy Information, Digital Preservation, Digital Document Quarterly, vol. 5, No. 1, 1Q2006, 12 pages, http://home.pacbell.net/hgladney/ddq_5_1.htm , Saratoga, CA.

PowerFile Inc., "PowerFile Introduces Permanent Storage Appliance," Press Releases http://powerfile.com/index.php?file=c-news&iNewsEventID=43, Jun. 19, 2006, 3 pages.

Rosenthal, David S.H. et al., Requirements for Digital Preservation Systems, D-Lib Magazine, Nov. 2005, vol. 11, No. 11, http://www.dlib.org/dlib/november05/rosenthal/11rosenthal.html, 23 pages.

* cited by examiner

METHOD AND SYSTEM FOR DIGITAL PRESERVATION HAVING LONG TERM ERROR-FREE STORAGE, RETRIEVAL, AND INTERPRETATION OF DIGITAL FILES

RELATED APPLICATION

The present application is a continuation-in-part of U.S. Ser. No. 11/473,069, filed Jun. 23, 2006, which is hereby incorporated by reference.

BACKGROUND OF THE INVENTION

In the vast world of digital information storage, there is need to preserve certain digital files. The files are originally in digital format or are files that have been converted to digital format from original content. To achieve digital preservation of the files, there are means needed for long term error-free digital storage of the files, means needed for files to be retrieved error-free from the storage, and means needed for interpretation of retrieved files, for all the time span that the storage continues on. Files retrieved from the storage must be error-free, because the loss of one byte from a digital file in a critical place can cause the entire file to effectively be corrupt.

Digital storage systems have been developed for storing digital files for extended periods of time. These storage systems have been used, for instance, to store corporate documents and emails in compliance with the five year storage requirements of the Sarbanes-Oxley Act. However, there are no systems of prior art that will store digital files error-free for 100 years and more, with error-free retrieval of user-requested files from the storage, and with interpretation of the retrieved files, for all the time span that the storage continues on.

Digital storage media for utilization in the long term error-free digital storage of this invention are true Write-Once, Read-Many (WORM) media. True WORM media, once written-to, cannot be overwritten. True WORM media are invulnerable to corruption by hacker and virus attacks, which attacks can occur when the media are connected, to the outside of the storage, for the retrieval of user requested files.

In all digital storage media, even in media new from the factory, there is an error rate, expressed as, e.g., error bytes per 100,000 bytes. Media errors increase with time passing, where small defects present at manufacturing grow in size, and grow in number, and additional defects emerge. Digital storage media use error correcting codes, and the software for these codes, termed "firmware," is incorporated as part of the drive for the media. A version of the Reed-Solomon (RS) error correction code is programmed into the firmware of the drive. The RS encoder takes a block of digital files that are being ingested and adds redundant bytes, to create an RS codeword that is stored on the media. On retrieval, the RS decoder processes each block and corrects media-induced errors so as to recover the original files. The firmware also incorporates software recovery retry algorithms that supplement the RS decoder in recovery of the original files on retrieval. Each RS codeword contains 255 codeword bytes, including bytes for error correction. The RS decoder, with added software recovery, can correct, in real time, 32 error bytes in one codeword. The employment of error correction codes allows for practical manufacturing of digital storage media.

The digital storage media industry's standard method for estimating the lifetime of digital storage media is an Arrhenius equation lifetime estimation model that uses data obtained from accelerated lifetime testing of the media (Ref. 1, p. 4). Samples of the media are tested at elevated temperatures that are beyond those experienced under normal usage, in order to accelerate the rate of growth of errors in the media. The result of an individual heating test is the lifetime, i.e., the hours-time-to-failure, of the sample medium under test at a given temperature. The tests are conducted at three different elevated temperatures, and the test results are entered on a plot of hours time vs. temperature, where the ordinate is a logarithmic scale of hours, a logarithmic-linear, or "log-lin" plot. An Arrhenius model plot of an estimated lifetime test of a Panasonic DVD media in shown in FIG. 1. The hours-time-to-failure of a medium under a heating test is determined as the hours of testing to the point when the error rate of the individual medium under test is observed to increase to a specified multiple of the initial error rate of the medium. For example, as stated in a note alongside the ordinate in FIG. 1, the "Archival Lifetime" point (hours-time-to-failure) occurs when the error rate of the medium under test is observed to increase to twice the initial error rate.

In FIG. 1, there are plotted three test data points, for the hours-time-to-failure, of media lifetime tests done at 90° C., 80° C., and 70° C., and the temperature of normal usage is shown as 30° C. For discussion purposes of FIG. 1, the hours-time-to-failure for each test data point has been scaled from the ordinate of the logarithmic scale of hours, as follows, using the 90° C. test data point as an example, as follows: the ordinate of the test data point is scaled from the ordinate as being 0.38 of the interval between 100 hours and 1,000 hours. The logarithm of the hours-time-to failure of the test is formed of characteristic "2" (between 100 to 999 hours) and mantissa "0.38"=2.38, the anti-logarithm of which is 240, the number of hours-time-to-failure of the medium under test. For the 80° C. test, the hours-time-to-failure of the medium under test is 870, and for the 70° C. test, the hours-time-to-failure of the medium under test is 1445. It is to be noted that as the test conditions become less harsh, i.e., the testing temperature is lower, the hours-time-to-failure of the medium under test increases.

It is the indicia of the media estimated lifetime testing by the Arrhenius model that the failure mechanisms of the media remain the same for all testing temperatures, and following on, then, a constant slope will be obtained for a straight line that is drawn through all the test data points. In FIG. 1, the straight line, as drawn by the Arrhenius testing facility for Panasonic, proceeds through the 90° C., 240 hours test data point and the 80° C., 870 hours test point. In drawing the straight line, the 70° C., 1,445 hours test data point was ignored. The straight line was then extended, beyond the 80° C. data test point, to intersect a vertical line drawn by the Arrhenius testing facility for Panasonic, a line that that indicates the 30° C. normal usage temperature point of the abscissa scale.

Extension of a line or curve into the future, beyond the last test data point, done by assuming the variables will continue to behave as they have in the past, is known as extrapolation. In FIG. 1, the far reach of the extrapolated line intersects the 30° C. temperature line at an ordinate scale reading of about 788,000 hours-time-to-failure, corresponding to about 90 years estimated lifetime. Thus the straight line was extrapolated in time, beyond the 80° C. data test point, the through 90 years of no test data. (A notation to the 90 years, 30° C. temperature point has been here added, for purposes of clarity, onto the Panasonic plot.) In FIG. 1, the Arrhenius model estimated lifetime of the Panasonic DVD is claimed to be 90 years, when the DVD is operated always at 30° C.

At media testing temperatures that are closer to the normal usage temperatures of the media, there may be failure mechanisms in the media that are different from those prevailing at higher testing temperatures. These different temperature-dependent failure mechanisms may produce hours-time-to-failure observed results that are shorter than the expected hours-time-to-failure failure results. This is evidenced in FIG. 1 where the 70° C. test data point is far below, in time, the extrapolated line drawn through the 90° C. and 80° C. test data points. The 70° C. data test point should not have been ignored, as the 70° C. test was the longest of the three tests, and it was the test of the media conducted at the temperature closest to the normal usage temperature of the media. A revised extrapolative line can be approximately fitted, with aid of a transparent straight-edge to all three test data points of FIG. 1, and that revised line would intersect below the 30° C. abscissa at about the location where a notation of an asterisk and dash have been here added onto the Panasonic plot. This location corresponds to a reading on the logarithmic ordinate scale of about 14 years estimated lifetime, a result that is many decades shorter estimated lifetime for the DVD. These huge shifts in estimated lifetime are concomitant with use of the Arrhenius model for estimated lifetime testing, which model incorporates extreme extrapolations in time from the last test data point, in conjunction with the plotting of hours-time-to-failure test data points against a logarithmic coordinate scale that is a highly compressive scale of time.

In the Arrhenius model for lifetime estimation of media, the hours-time-to-failure tests of the media are conducted within a period of from 3 to 12 months. To derive a lifetime estimation for the media under test, by extrapolating a straight line, the beginning of which line was drawn though a set of data test points that were gathered in a relatively short time period, on through time spans of no test data, can be inaccurate. It would be uneconomical of utilization of storage media and media equipment, and unsafe of retrieval of error-free files from the media, to base long term error-free digital storage solely on media lifetime claims that are derived from Arrhenius model extrapolative testing.

Means for the interpretation of user-requested retrieved files are required when, in the future, the programs and operating systems that originally were needed for interpretation of the retrieved files have become obsolescent. There are efforts for interpretation of files retrieved from long term digital storage that use virtual computers and emulation. One such effort utilizes a Universal Virtual Computer (Ref. 2). Another effort that resulted in a working method for interpretation is the technique of Migration-on-Request (MoR). MoR was developed at Leeds University, UK (References 3, 4). The Migration Tool (MT) of the MoR decodes and transforms retrieved files to usable formats, allowing the user to reuse the digital objects, to repurpose them, and to use them elsewhere. Repurposing is exploiting the retrieved files in new ways, e.g., editing, correcting, extracting from them.

MoR interpretation requires that the files of the long term error-free storage remain in the format as originally ingested (Ref. 3, Section 1) (Ref. 4, p. 1, p. 4). Migration of files means copying the files while changing the format of the files. In contrast, forward copy of files, wherein the term "forward copy" is a new term created for the purposes of this patent, means that files are copied, unchanged, from one media to another media. It is important to note that migration of files, and forward copy of files, are entirely different operations. Each sequential migration of files introduces losses in the file, losses that are accumulatively propagated forward in time (Ref. 4, pp. 2-3). In the MoR approach, files are singly migrated, upon user-request for files, always from the original ingestion format, to the future, then-current, usable format, by the then-current MT. Thus the MoR approach prevents migration losses from being propagated forward, because with MoR there is never more than a single migration.

SUMMARY OF THE INVENTION

Digital preservation is realized in this invention by providing a method and system for long term error-free storage, having means for requested files to be retrieved error-free from the storage, and having means for interpretation of the retrieved files, for all the time span that the storage continues on. User-requested files, when retrieved from the long term error-free digital storage, are retrieved without possibility of corruption of the files of the storage. The storage of the files is continued on in time, by being forward copied, error-free, from one-era storage media to next-era storage media. Planning for the timing of forward copy from the one-era media is accomplished by methods for contemporaneous determination of the actual lifetime of the one-era media, through monitoring scans of the written-to media.

Long term error-free storage of digital files, for purposes of this invention, is stated as being 100 years and more. The long term error-free storage is achieved by using storage media that are impervious to overwriting corruption from outside signals when user-requested files are retrieved by connectivity to the outside of the storage The long term error-free storage is further achieved by the error-free forward copy of the digital files from one-era media to the next-era media before the time when the one-era media reaches the end of its lifetime. The use in this invention of a method for contemporaneous determination of actual media lifetime serves to achieve economical utilization of digital storage media and media equipment.

DETAILED DESCRIPTION OF THE INVENTION

Figure 1:
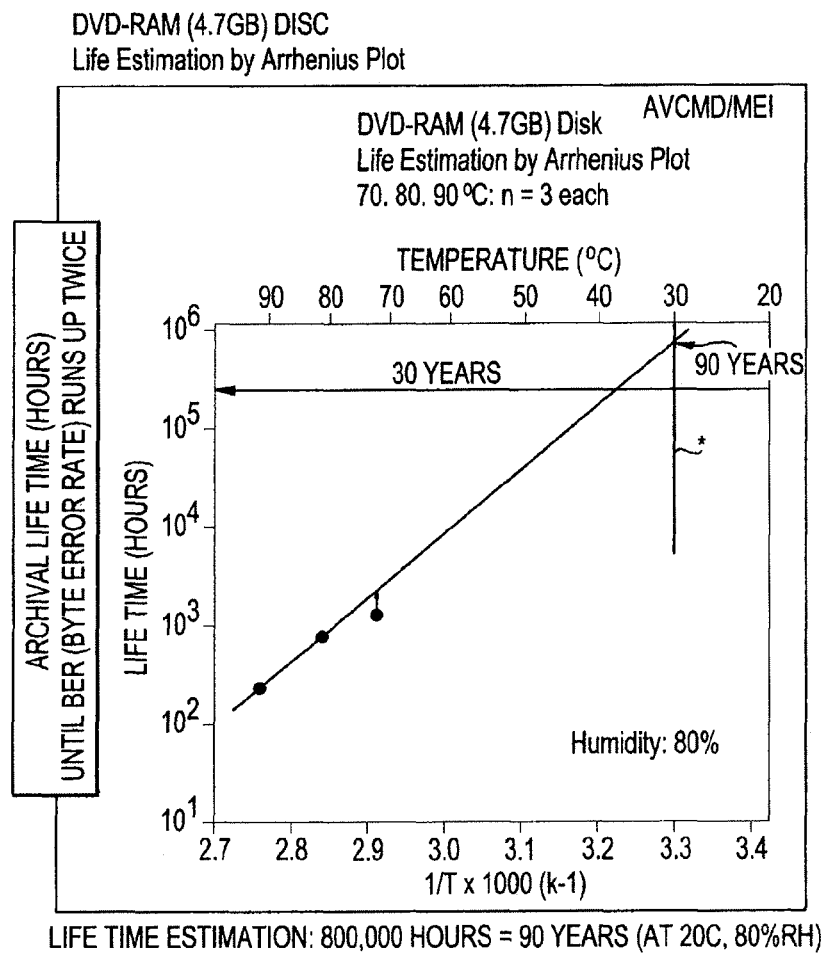
FIG. 1 shows an Arrhenius Plot used to determine the life estimation of a DVD.

New true WORM media are Ultra Density Optical (UDO) phase-change disc media, having storage capacity per disc of 30 Gigabytes (GB). The drives for follow-on 60 GB UDO and 120 GB UDO media are planned to be backward-read compatible for the 30 GB UDO media. Future true WORM media can include, for instance, holographic media, having storage capacity per disc of 200 GB, or more.

For long term error-free storage, the storage media and the media equipment should preferably be installed in a controlled environment, in a Digital Preservation System (DPS) facility, where the media and equipment are maintained at the manufacturer's recommended temperature and humidity levels, and dust levels are controlled. The DPS facility includes computers on which applications are installed that control the operations of the media and the media equipment, and that control added features such as: fire protection and fire suppression equipment; building access security; and uninterruptible electrical power supplies. The DPS facility can have staff for programming, staff for security; and staff for maintenance and operations.

For the purposes of long term error-free digital storage, a time arrives when the files written to the one-era media must be forward copied to the next-era media. The forward copy is occasioned due to the growth, over time, in the size of defects, and in the number of defects, on the media. The defects cause byte errors in files on the media, byte errors that are normally corrected by the error correction codes on retrieval of files from the media. Eventually, the defects proliferate on a media to an amount, and size, that the error correction can no longer correct all byte errors in files that are retrieved from the media. The point when retrieved files become unreadable corresponds to the end of the lifetime of the media.

In this invention, the lifetime of the written-to media is ascertained by using a method of contemporaneous monitoring of the residual error correction capacity of the media The lifetime of a media is the period of time in which files recorded on the media can be retrieved with no uncorrectable errors. Preferably, planning for forward copying of the files to next-era media is scheduled through the use of the monitor program (Ref. 1). The monitor program is programmed specifically for each DPS and can be integrated into the application that operates the DPS. The application notes the serial numbers of the mediums and records and analyzes the results of the monitor data scans of residual error correction capacity of all media, where scanned media are individually identified by serial number.

To monitor residual error correction capacity, the monitor can scan the mediums for average error rate as the indicia, e.g., one byte per 10,000 bytes, one byte per 1,000 bytes. Preferably, the monitor will scan the medium sector by sector for measurement of residual error correction capacity. (Ref. 1, p. 4). The UDO sector has capacity for 8,192 user bytes. The 30 GB UDO has two sides of 15 GB each. On each side the total number of sectors is 1.83 million (1.83×8,192=15 GB). The sectors lie along circular tracks, and the tracks are grouped in bands. For example, at the outermost band there are almost 7,000 tracks, and the tracks are spaced apart across a radial distance of 2.6 mm; and, at the innermost band there are almost 6,000 tracks, and the tracks are spaced apart across a radial distance of 2.2 mm. (These UDO specifics are from European Computer Manufacturer's Association Standard—350 for UDO, 1$^{st}$ Edition, December 2003.)

In the sector model of scanning, the monitor program would scan the totality of the 2×1.83=3.7 million user sectors of an individual UDO. The time taken, at an average read rate of 8 Megabytes (MB) per second (8 times 10 to the power 6 bytes/second), can be calculated by dividing 30 GB by 8 MB/sec=3,750 seconds=63 minutes. Additional time has to be added for the application to analyze the monitor scan data, for pickarm loading of the media to a drive, for pickarm turning the media over in the drive, and for pickarm unloading of the media from the drive; this time is estimated to be 15 minutes. The total estimated time for monitor scan and analysis of all user sectors of a 30 GB UDO medium would be 63+15=78 minutes. In an exemplar DPS of 100 Terabyte (TB) storage, there would be 100 TB divided by 30 GB=3,334 UDO mediums.

If the monitor would scan all sectors of each medium of the entire exemplar DPS storage, the time taken would be an estimated 3,334×78 minutes=260,000 minutes=4,334 hours. One approach for monitor scans of all sectors of the media of the entire DPS storage would be that some mediums would be scheduled for scans in a drive of each pickarm library equipment, while other mediums would be available for retrieval of user-requested files in a different drive in each pickarm library. If the DPS was not operated on a fulltime 24/7 basis for user requested retrieval, and there were scheduled down times, full sector monitor scans of all sectors of the mediums could be scheduled during down-time hours. Another approach would be that some fraction of the media of the DPS could be scanned by the monitor when a medium is already loaded in a drive for retrieval purposes, the scanning to begin after the retrieval is completed. The monitor program, being integrated into the application, serves to prevent conflicting demands on the DPS.

Another model of sector scanning is that the monitor program would scan a fraction of the tracks of the media, e.g., 10% of the tracks, and thus approximately 10% of the sectors. The total estimated time for monitor scan and analysis of 10% of the tracks of a 30 GB UDO medium would be 6.3 minutes, plus 2 minutes for analysis and medium handling, adding to a total of 8.3 minutes. The time taken for monitor scanning of 10% of the tracks of all the mediums of the DPS would be an estimated 3,334×8.3=27,700 minutes=461 hours.

On a medium, any defect, which is large enough to cause the residual error correction capacity of one sector on one track to be anomalously low, will spread to sectors on many adjacent tracks. In the model for monitor scanning of the storage in which a fraction of the tracks of a medium are scanned, the scanning will find one or more sectors on adjacent tracks that are reduced in residual error correction capacity, the reduced capacity being caused by the same large defect. Sectors of anomalously low residual error correction capacity would be designated "worst" sectors. Each sector of each serialized medium is identified with a unique Physical Block Address (ECMA—350) and thus the monitor can return to the same track to scan the worst sector of the sampled tracks of each UDO of the DPS storage.

The goal of any model for monitor scanning would be to ensure that there remains sufficient capacity for error correction when the files of the one-era media of the DPS are forward copied to the next-era media. The forward copy to next-era media and media equipment would be planned, and then implemented, with error-corrected forward copy of the files to the next-era media. The frequency of monitor scanning of the one-era media would be established as a function of the trending being developed in the plot of the scan data. There would be a monitor scan made of the one-era media soon after the storage of the one-era media is implemented, and the data of this initial scan will serve as the baseline for the follow-on scans of the one-era media. The next scans could be six months later, then one year later. There would then be the baseline scan data point and 2 further scan data points on the plot of the scan data. If there is little or no decrement observed in the residual error correction capacity, then follow-on scans can be scheduled every year, until sufficient data points are obtained to indicate whether or not scans can be scheduled every two years, or every year, or more frequently.

On a monitor scan of all the mediums of the DPS, it might eventuate that one medium has an anomalous worst sector, or that several of the mediums have anomalous worst sectors, while the monitor scans of the bulk of the mediums of the DPS storage evidence no worst sectors. Then it is possible that the one medium with an anomalous worst sector, or the several mediums with anomalous worst sectors, can be replaced with new mediums from spares stock. The new replacement mediums would be written to from the mediums being replaced. Media that were installed at the outset of the storage should be subjected to quality control at the factory, including: media certification by being scanned in a read mode in a calibrated drive; and, measurement of error rates on fully written-to sample media that were taken from production lots, to confirm that the scanning is effective. In a DPS of 3,334 media, it is possible that one or several of the mediums would have early-on anomalous worst sectors, and it would be errant to base a forward copy on the detected medium or media. The next monitor scan of all the mediums of the DPS would reveal that either the early-on worst sector medium was, or mediums were, uniquely anomalous in their production quality, or, that more mediums of the DPS have early-on worst sectors. In the latter case, the media of the DPS are unsatisfactory for purposes of long term error-free storage, and forward copy would be planned and implemented while sufficient residual error correction capacity remained to ensure error-free forward copy.

The model for monitor scanning must include a system for the analysis of the data from the monitor scans of the media. The sector model of scanning can scan at the RS codeword level, to monitor how close the residual error correction capacity is to the maximum correctable limit. Of the 32 bytes that can be corrected in one codeword, there will be a small number of errors in the codeword when the codeword is calculated and written to the medium. If there are no more than 4 initial bytes in error, then there can be 28 incremental errors before a sector becomes unreadable. When there are 14 incremental errors, i.e., the error rate is doubled, that level of errors would correspond to the hours-time-to-failure cut-off of a heating test in the Arrhenius model for estimation of media lifetime. This cut-off of testing in the Arrhenius model is done because even at mildly elevated temperatures of testing, e.g., 70° C., the test can take thousands of hours before the error rate doubles. Thus it is not accurately known for any digital media, including the new UDO, how many years, and possibly decades, will pass before the error rate doubles, when the media are operated at facility controlled environment temperatures of 20° C. to 25° C.

The monitor program of Reference 1 has been developed by the manufacturer of the UDO media, and the program can be integrated to run as part of the application for a digital storage facility. As yet no vendor has integrated the monitor program in their application software. Thus there is no experiential knowledge of the type of curve that would describe the decrement, with time passing, of the incremental byte errors of the codewords. For example, if the 28 incremental byte errors available for correction, at initiation of the storage, decrease to 14 incremental byte errors in 20 years, as ascertained through the monitor scanning of the media, this reveals nothing about the additional time span at which the incremental byte errors would decrease to 7 incremental byte errors, or to 4 incremental byte errors. The lower levels, being decreased capability to correct byte errors, are levels at which forward copy could be planned for, and implemented. The 28 incremental byte errors available for correction at initiation may decrease to 14 incremental byte errors in 10 years, or may decrease to 14 incremental byte errors in 100 years.

The invention includes planning for forward copy by permitting a plot of monitoring data to be generated of the remaining capability to correct byte errors in codeword versus time in years. Actual data will exist for the plot when a monitor-scanned-DPS is implemented and is in operation. Planning for forward copy with use of the monitor scan data would involve no extreme extrapolation. The plotting of byte error data on the ordinate scale versus time in years on the abscissa scale, would be a plot made with linear coordinate scales, a 'lin-lin" plot, not the plotting against a logarithmic coordinate scale that is a highly compressive scale of time, as is incorporated in the Arrhenius model (the effects of a logarithmic scale of time, for plotting data, are discussed in Background of the Invention).

Figure 3:
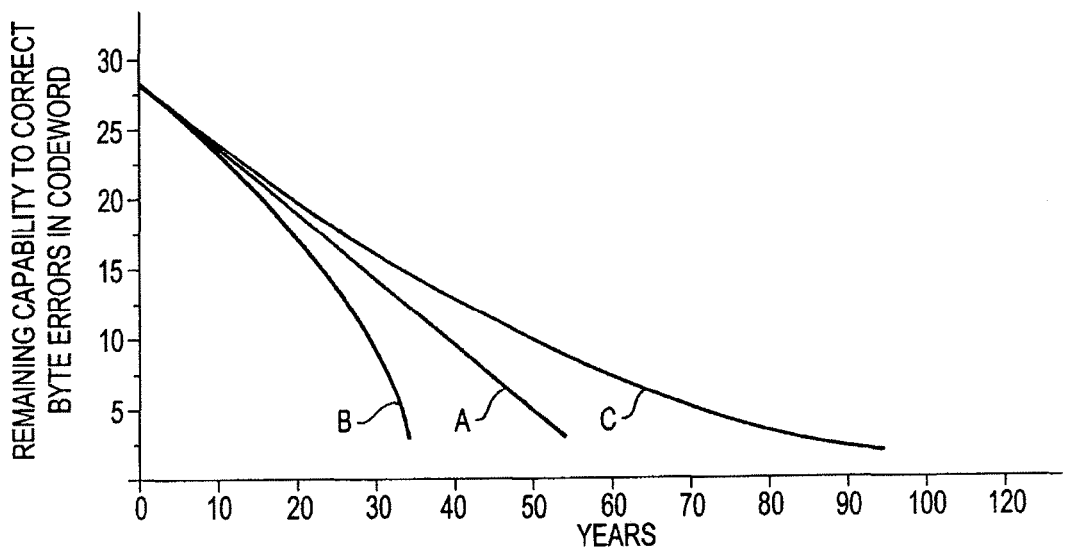
FIG. 3 is an example of monitor data plots for remaining capability to correct errors.

An exemplar plot of monitor scan data that can be generated in accordance with this invention is shown in FIG. 3. If, with years passing, the plot of points of the monitor scan data lie on a straight line extended down from the coordinate of 28 incremental byte errors, and 0 time, a curve fitting by linear regression would be a method for fitting a predictive equation to the plot of those points (FIG. 3, curve A). If the plot of points of the monitor scan data demonstrates a departure from linearity, either concave down toward the abscissa (FIG. 3, curve B), or a turning outward toward becoming asymptotic with respect to the abscissa (FIG. 3, curve C), a curve fitting by polynomial least-squares would be a method for fitting a predictive equation to the plot. In either case, an extrapolation in time, of the fitted line or curve, by only several years beyond the most recent monitor scan data point, on the lin-lin plot, would provide the information needed for the planning and implementation of forward copy from the one-era media to the next-era media. These planning and implementation actions, based on the monitor scans of the media, will achieve economical utilization of the one-era media and media equipment.

When the files are forward copied from the one-era media, all errors of the one-era files are corrected, during the forward copy process, by the one-era error correction, this being the same action of error-correction as when user-requested files are retrieved from the one-era media. The requisite for error-free forward copy is to ensure, through monitoring, that there remains sufficient residual error correction capacity for correction of the one-era files at the tine of forward copy. The next-era drive adds error correction redundant bytes to the next-era media, and the long term error-free digital storage cycle starts again, as if the original user files had been initially written to the next-era media, and as if the digital storage era aging clock had been reset to zero. In detail, the files as stored on, e.g., the one-era media, are not error-free on the media itself, the files are only error-free when retrieved, made error-free by the error correction. When the files are forward copied to the next-era media, the files as forward copied are error-free, just as occurs in retrieval. This process of error-free forward copy ensures that retrieval from all future next-era media of the storage will be error-free, i.e., the files retrieved in the future will be as originally ingested to the long term error-free storage.

One problem to digital preservation in time periods that are short in time span as compared to the time span of digital preservation is that of interpretation of user-requested files which are retrieved from the long term error-free digital storage, when in the future the programs and operating systems that originally were needed for interpretation of the retrieved files have become obsolescent. The present invention enables planning for such obsolescence by making interpretation available for the retrieved files for the entire time span that the storage continues on, since otherwise the long term error-free digital storage of the files will have been futile.

In a DPS design, using MoR for interpretation, it is assumed that the long term error-free digital storage of this invention has been implemented. Incorporated in the DPS designs is the monitoring of the residual error correction capacity of the one-era media to be utilized in the planning of the forward copy to next-era media. In the MoR interpretation, the MTs are modular, meaning that an Input Module (IM) is written for the format of the files as originally ingested, and Output Modules (OM) are written for the then-current formats. Each MT has, in addition to the IM and the OM, an Intermediate Structure (IS) (Ref. 4, p. 5). The IM takes the elements and hierarchies of the format of the ingested files, and stores the elements and hierarchies in the IS. Thus in the case of ingestion of files of a single format, the IM and the IS are invariant with time. In this invention's design of DPS's using MoR, for purposes of simplification of description, the IS is preferably not shown, but is treated as being an integral part of the IM.

As new usable formats arise in time, new Output Modules must be written for the new formats. The preferred schema for the design of migration tools is described, for instance, in Reference 3, Section 3. The test for the efficacy of a migration tool is the reversible migration test. This test is done by migrating the migrated version of a digital file back into the original format, using the migration tool in reverse, and then by making a comparison of the reverse migrated version of the file with the original file (Ref. 3, Section 6).

The migration tools run as an application on a computer, and for the maintenance of the migration tools, the migration tools should be programmed in a standardized, widely used programming language, a language that will last for decades. At present, C is a programming language that has already lasted for almost four decades, and C may last on as a programming language for many more decades. When the current computer becomes obsolete, future computers will have compilers for programs written in C. When C itself becomes obsolete as a programming language, the existing migration tools will have to be ported to the new programming language, and new migration tools will have to be written in the new language. The new programming language should last as long as C will have lasted, providing then for the maintenance of the migration tools for four or more decades.

Figure 2:
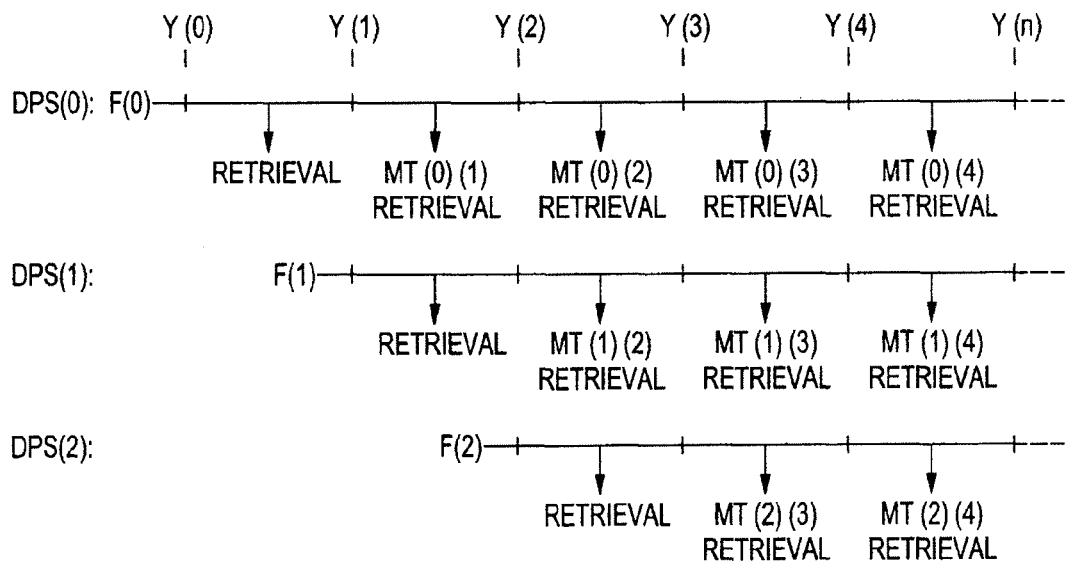
FIG. 2 shows an embodiment of the interpretation over time.

In the DPS designs of FIG. 2, there are shown the use of the MTs through the decades of digital preservation. If there is an initial ingestion of single-format files Format (0) ["F(0)"], then only one DPS(0) is needed. If additional ingestions of F(0) files are required, then F(0) files can be ingested to DPS(0) from Year(0) ["Y(0)"] to Y(1), and beyond. At Y(1), the new selected format for the files is F(1), and an additional DPS(1) is needed for ingestion of F(1) files. Files of F(1) are ingested to DPS(1) from Y(1) to Y(2), and beyond. At Y(2), the new selected format for the files is F(2), and an additional DPS(2) is needed for ingestion of F(2) files. Here follow the time-line descriptions of DPS(0), DPS(1), DPS(2). The time-lines are depicted diagrammatically in FIG. 2.

DPS(0)

a. Year (0) is the year when the files are ingested, in Format (0) [F(0)] to DPS(0). Additional new files in F(0) can be ingested to DPS (0) between years Y(0) and Y(1). If F(0) files remain available for ingestion after Y(1), F(0) files can be ingested to DPS(0) beyond Y(1). Between Y(0) and Y(1), retrieval of user-requested files is done directly, in F(0), without use of an MT.

b. Y(1) is the year when F(1) becomes the new usable format for files of F(0), and Migration Tool (0)(1) is written and implemented to migrate user-requested files that are stored in DPS(0) from F(0) to F(1). The terminology of the modular Migration Tools, as employed here, has two numbers appended to the "MT," where the first number refers to the ingested format and the second number refers to the then-current format. "MT(0)(1)" means an MT with IM for F(0) and with OM for F(1).

c. Y(2) is the year when MT(0)(2) is written and implemented to migrate user-requested files that are stored in DPS (0) from F(0) to F(2).

d. Y(3) is the year when MT(0)(3) is written and implemented to migrate user-requested files that are stored in DPS (0) from F(0) to F(3).

e. Y(4) is the year when MT0)(4) is written and implemented to migrate user-requested files that are stored in DPS (0) from F(0) to F(4).

f. Y(n) is the year when MT0)(n) is written and implemented to migrate user-requested files that are stored in DPS (0) from F(0) to F(n).

DPS(1)

a. After Y(1), if new files are ingested in F(1), these new F(1) files will be ingested to a DPS(1). Additional new files in F(1) can be ingested to DPS (1) between years Y(1) and Y(2). If F(1) files remain available for ingestion after Y(2), F(1) files can be ingested to DPS(1) beyond Y(2). Between Y(1) and Y(2), retrieval of user-requested files is done directly, in F(1), without use of an MT b. Y(2) is the year when F(2) becomes the new usable format for files of F(1), and MT(1)(2) is written and implemented to migrate user-requested files that are stored in DPS (1) from F(1) to F(2).

c. Y(3) is the year when MT(1)(3) is written and implemented to migrate user-requested files that are stored in DPS (1) from F(1) to F(3).

d. Y(4) is the year when MT(1)(4) is written and implemented to migrate user-requested files that are stored in DPS (1) from F(1) to F(4).

e. Y(n) is the year when MT(1)(n) is written and implemented to migrate user-requested files that are stored in DPS (1) from F(1) to F(n)

DPS(2)

a. After Y(2), if new files are ingested in F(2), these new F(2) files will be ingested to a DPS(2). Additional new files in F(2) can be ingested to DPS (2) between years Y(2) and Y(3). If F(2) files remain available for ingestion after Y(3), F(2) files can be ingested to DPS(2) beyond Y(3). Between Y(2) and Y(3), retrieval of user-requested files is done directly, in F(2), without use of an MT b. Y(3) is the year when F(3) becomes the new usable format for files of F(2), and MT(2)(3) is written and implemented to migrate user-requested files that are stored in DPS (2) from F(2) to F(3).

c. Y(4) is the year when MT(2)(4) is written and implemented to migrate user-requested files that are stored in DPS (2) from F(2) to F(4).

d. Y(n) is the year when MT(2)(n) is written and implemented to migrate user-requested files that are stored in DPS (2) from F(2) to F(n).

In the above-described DPS designs, if files of multiple selected formats are to be digitally preserved, for example, files of images, and files of sounds, then files of each format are ingested to a DPS for files of images, and a DPS for files of sounds.

The time span from Y(0), the year of the initial ingestion to DPS(0), to the time beyond Y(4) when F(4) is replaced by the next usable format F(n), can be calculated by assigning, as an example, a 20-year time span to each useable format, the total time span would then be 100 years. As can be seen in FIG. 2, for that 100-year period the number of MTs are nine: four for DPS(0); three for DPS(1); and, two for DPS(2). Because the MTs are modular, the nine MTs are themselves comprised of totality of: three IMs [IM(0), IM(1), IM(2)], and four OMs [OM(1), OM(2), OM(3), OM(4)]. Following on the logic of this 100-year DPS design example, the DPS designs can be extended to any number of additional decades of digital preservation storage.

In certain industries usable format changes may occur as frequently as several times per year, meaning that many more MTs will be needed than as calculated above. Alternatively, as a cost-saving measure, it may be possible for an industry to select a single format that would be useable for many decades, thus lessening the need for coding of new Migration Tools. For example, there is a current effort to achieve world-wide standardization of a single Extensible Markup Language (XML) format, a format that will be used, for example, for formatting files of Microsoft WORD (Ref. 5). In the case of a standardized format for multiple files, the files of that format would be stored in the long term error-free digital storage of this invention, where the user-requested files are retrieved error-free and where the interpretation of the user-requested retrieved files will be accomplished, for example, by a form of XML reader.

In a second example of a DPS design, there can be a single DPS for ingested files of multiple formats, in which each stored file contains a pointer to its designated IM. When there is a user-request for a specific file, the file pointer in the requested file calls up the designated IM, where the designated IM is a component of the MT needed to migrate the requested file from its original format, as ingested, to the format selected for that file in the then-current period. With files of multiple formats ingested to a single DPS, e.g., two image formats and one sound format, the file pointer action, upon user-request for a specific file, is as follows:

Format(0)=originally ingested files of Format(0); file pointer calls up the then-current MT having input module IM(0). In the time period when Format (0) is usable, there is no MT with IM(0), and thus the F(0) files in that period are retrieved from the digital storage without use of an MT.

Format(1)=originally ingested files of Format(1); file pointer calls up the then-current MT having input module IM(1). In the time period when Format (1) is usable, there is no MT with IM(1), and thus the F(1) files in that period are retrieved from the digital storage without use of an MT.

Format(2)=originally ingested files of Format(2); file pointer calls up the then-current MT having input module IM(2). In the time period when Format (2) is usable, there is no MT with IM(2), and thus the F(2) files in that period are retrieved from the digital storage without use of an MT.

In a third example of a DPS design, the user-requested files are retrieved without need for format pointers. With files of multiple formats ingested to a single DPS, e.g., two image formats and one sound format, the control computer retrieves user-requested files through all the then-current MTs, with the result that only one file of the three retrieved files is patently interpreted to usability.

If additional files are ingested to a DPS, e.g., new files in F(0) ingested to DPS (0) between years Y(0) and Y(1), the media for the newly added files have a start date later than the start date of the media to which files were ingested at Y(0). The monitor scans of the serialized added media will be a new set of analyses of residual error correction capacity data, monitor scan data not to be commingled with the monitor scan data of the Y(0) media.

Figure 4:
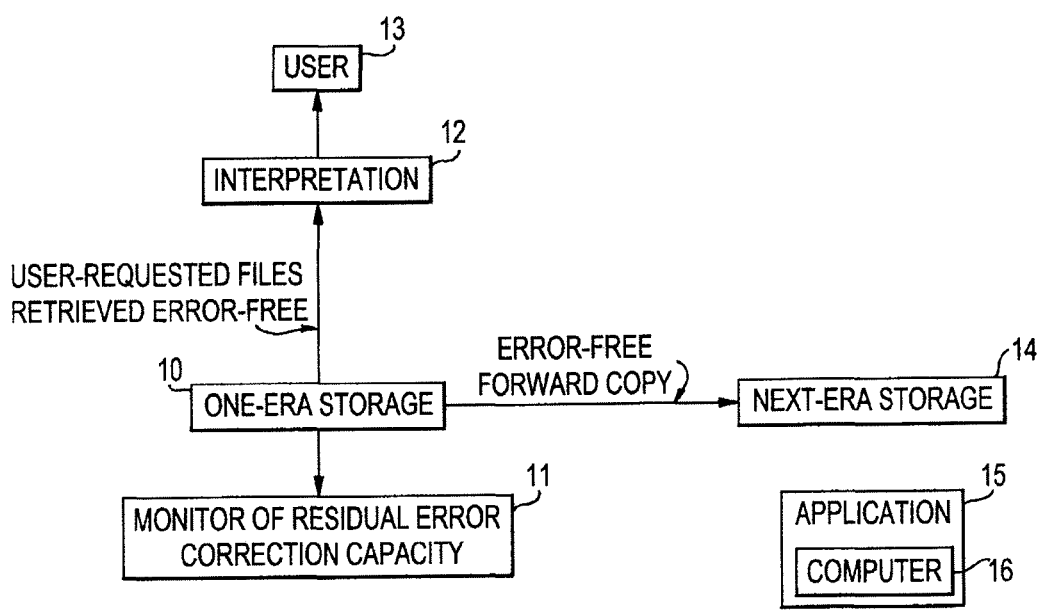
FIG. 4 is a block diagram of the system and operation of the invention.

FIG. 4 depicts the operation of a DPS in schematic form as used in accordance with the present invention. The written-to media of the one-era storage 10 are scanned by the monitor program 11 to measure the residual error correction capacity of the one-era media. There are user-requested files that are retrieved error-free from the one-era storage. The retrieved files are interpreted by the interpretation means 12, and sent to the user 13. When a decision is made to forward copy the files, based on the information from the monitor scans 11 about the residual error correction capacity of the one-era media of the one-era storage 10, the files are forward copied error-free to the next-era media of next-era storage 14, and the storage cycle of the DPS continues on in time, in the same manner, with the next-era storage. The application 15, which is installed in the computer 16, controls the system of the DPS: operation of the storage media equipment; ingestion of files to the media; retrieval of user-requested files; interpretation of user-requested files; monitor scans of the media, and, forward copy to next-era media.

Computer equipment for use with the application typically has manufacturer support for no more than 7 years. While the one-era media and the media equipment (drives, machinery) may progress in time without requiring forward copy for, e.g., 75 years, the computer equipment will have to be replaced and new applications will have to be written a number of times within the one-era of 75 years While the files stored on true WORM media cannot be overwritten, and thus corrupted, by virus and hacker signals when there is connectivity for retrieval to the outside of the storage, there is a possibility that the error correction firmware of a specific drive can be corrupted by outside signals. A hacker can corrupt the firmware of a drive to return false information from the medium in the drive, which no redundant bytes on the medium can prevent. However, when the medium is inserted in a drive with uncorrupted firmware, the original file content on the medium can be retrieved. The drive with corrupted firmware would have to be replaced, or, the original firmware could be reloaded in the drive.

While only a single medium is necessary for a file in digital preservation, because of an untoward event, e.g., fire, physical attack, earthquake, a duplicate file copy on a second medium serves to provide backup. For greater physical security of the backup files, the backup media should be stored at a site remote from the first site. Should an emergency require, a duplicate and complete digital preservation system could be implemented at the remote site.

Figure 5:
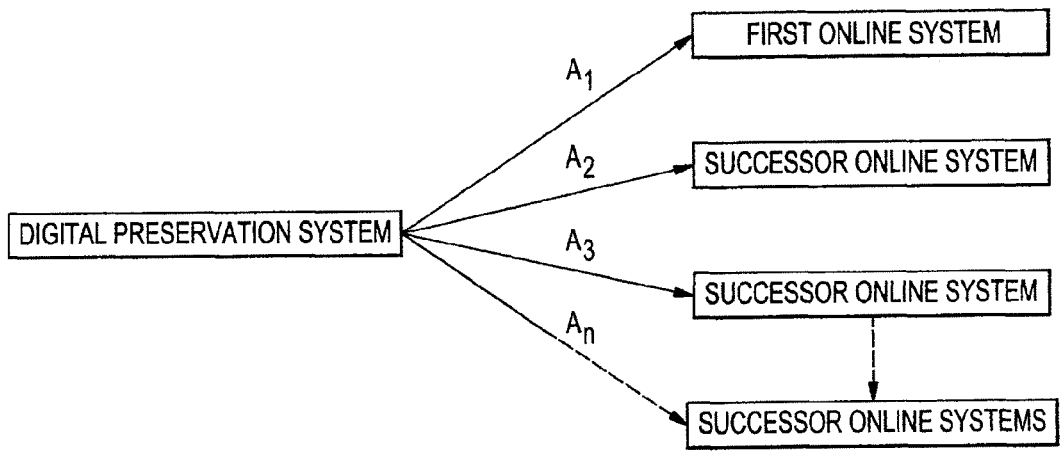
FIG. 5 is a block diagram of a parallel system.

An entity may want an online web presence of some or all of the files of its digitally preserved holdings, in service, for example, to the public. In the digital preservation system of this invention, the use of individual disc media, where the retrieval rate from the disc media is slower than the retrieval rate from the hard disc drives arrays of online storage systems, and where there are delay times incurred with physical movement of the disc media into and out of the drives for retrieval, makes the retrieval rate from the digital preservation system slow as compared with the near-instantaneous retrieval rates associated with online web searching. An entity's digital preservation system can be in parallel with an online digital storage system, where among the files stored on this first parallel online system there are stored a fraction of, or the totality of, the files stored on the digital preservation system. The digital preservation system of this invention is long-lived, and the true WORM media of the digital preservation system are proof against virus and hacker attack. In contrast, the online hard disc array system is short-lived, and is vulnerable to corruption from virus and hacker attack. The entity's digital preservation system of this invention will serve as the source of error-free files needed for backup and restore of the entity's first parallel online system, and as the source of error-free files needed for ingestion to and backup and restore of the entity's successor parallel online systems. In FIG. 5 are shown the digital preservation system and the first, then successor, parallel online systems. The symbols, A1, A2, A3, . . . An, in FIG. 5 represent ingestion to, and backup and restore of, the first, then all successor parallel online systems, with files retrieved from the digital preservation system.

Figure 6:
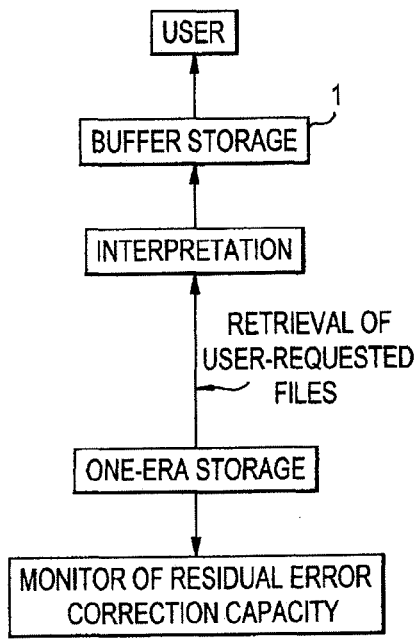
FIG. 6 is a diagram of the system having buffer storage for purposes of rapid retrieval and repurposing.

Because of the comparatively slow retrieval rate of files from the DPS, as described in the previous paragraph, there may be circumstances when fast retrieval of user-requested files that are stored in the DPS is necessary, e.g., for transmission to a parallel on-line system, or transmission to an earth satellite receiver. Another factor would be that for repurposing of the user-requested files, e.g., to edit, correct, or extract from the files, or to make seamless the files that are retrieved in sequence from two or more mediums of the DPS. Fast retrieval, and provision for repurposing, can both be accomplished with buffer storage, wherein the buffer storage is provided as a separate element located remote from the DPS, but in communication with the DPS, as shown in FIG. 6 (1). The buffer storage will be of sufficient capacity for the user-requested files, and user-requested files are ingested to the buffer storage from the DPS at the rate allowed for retrieval of files stored in the DPS.

LIST OF REFERENCES

1. "Monitoring of Optical Media Archives." Longman, R. J., Commercial Optical Storage Application Group, Optical Storage Technology Association, December 2004.
2. "A Project on Preservation of Digital Data," Lorie, Raymond A., IBM Almaden Research Center, RLG DigiNews, Vol. 5, No. 2, June 2001.
3. "Migration on Request, a Practical Technique for Preservation," Mellor, Phil; Wheatley, Paul; Sergeant, Derek, University of Leeds, UK, 2002.
4. "Migration on Request," PowerPoint presentation, Mellor, Phil; Wheatley, Paul;
5. "Announcing Submission of Office 12 XML Formats to ECMA International for Standardization," Sinofsky, Steven, Microsoft Office, November 2005.

The invention claimed is:

1. A method for long term storage of digital information, the method comprising:
   storing the digital information on a first storage media, the first storage media being a write-once, read many (WORM) media;
   user-requested retrieval of digital information from the first storage media;
   retrieval of the digital information from the first storage media as forward copy of the digital information to a second WORM storage media;
   monitoring scans of the first storage media to obtain data of the incremental byte errors available for error correction at the time when each scan is made, wherein the monitoring scans include a first scan being carried out at startup of the first storage media, and then follow-on scans are conducted at intervals, the spacing of which is determined by evaluation of scan data history;
   plotting of the data of incremental byte errors from the scans versus the time in years to predict an end of life time estimation of the first storage media, wherein at the end of life time estimation of the first storage media is a point in time at which there is insufficient residual error correction capacity to correct errors in the digital information being retrieved from the first storage media; and,
   wherein a time span is selected, before the end of life time estimation, to forward copy the digital information to the second storage media so that sufficient residual error correction capacity of the first storage media exists to correct errors in digital information retrieved from the first storage media for forward copy of the digital information to the second storage media.

2. The method of claim 1, where the forward copy of the digital information from the first storage media to the second storage media is achieved before the end of life time estimation, so that sufficient residual error correction capacity of the first storage media exists to correct errors in digital information retrieved from the first storage media for forward copy to a second storage media.

3. The method of claim 1, further interpreting the stored digital information that is retrieved from the first storage media.

4. The method of claim 1, wherein the interpreting of the user-requested digital information comprises interpretation by one of emulation, virtual machines, migration on request, and by interpreters for constant digital information formats as XML Reader for standardized XML.

5. The method of claim 1, wherein the user-requested retrieved digital information is interpreted to then appropriate and usable formats.

6. The method of claim 1, where the digital information was first stored in multiple formats, and user-requested retrieved digital information is interpreted to a then appropriate and usable format.

7. The method of claim 1, wherein the life time estimation of the first storage media is related to the growth over time of the size of, and the numbers of defects of the first storage media.

8. The method of claim 1, wherein an end of the life time estimation is a point in time at which the stored digital information becomes uncorrectable on retrieval.

9. The method of claim 8, wherein the forward copying of the stored digital information is performed prior to the end of the life time estimation.

10. The method of claim 1, wherein the life time estimation is a period of time in which the stored digital information can be retrieved, or forward copied, from the first storage media with no uncorrectable errors.

11. A digital preservation system (DPS) comprising:
   a first storage media for storing digital information arranged in equipment for handling media, the first storage media being a write-once, read-many (WORM) media;
   retrieval upon user-request of digital information from the first storage media;
   retrieval of the digital information from the first storage media and forward copying the digital information to a second WORM storage media;
   a program for monitoring scans of the first storage media to obtain data of the incremental byte errors available for error correction at the time when each scan is made, wherein the monitoring scans include a first scan being carried out at startup of the first storage media, and then follow-on scans are conducted at intervals, the spacing of which is determined by evaluation of scan data history, and wherein the analysis of the data of incremental byte errors from the scans versus the time in years is utilized to predict a point in time of the end of life time estimation of the first storage media, where at end of life time estimation of the first storage media there is insufficient residual error correction capacity to correct errors in digital information being retrieved from the first storage media; and,
   a time span is selected, before the point in time of the end of life time estimation, to provide a period in which a second storage media is planned and implemented, in order that there will exist sufficient residual error correction capacity of the first storage media to correct errors in digital information being retrieved from the first storage media for forward copy of the digital information to the second storage media.

12. The system of claim 11, wherein the copying of digital information from the first storage media to the second storage media is achieved while there exists sufficient residual error correction capacity of the first storage media to correct errors in digital information being forward copied from the first storage media to the second storage media.

13. The system of claim 11, wherein an end of the life time estimation of the media is a point in time at which the stored digital information becomes uncorrectable on retrieval from the media.

14. The system of claim 11, wherein the forward copying of the stored digital information from the media is performed prior to the end of the life time estimation of the media.

15. The system of claim 11, wherein the life time estimation of the first storage media is related to the growth over time of the size of, and the numbers of defects of the first storage media.

16. The system of claim 11, wherein the stored digital information is copied from the first storage media to the second storage media while the format of the digital information remains unchanged.

17. The system of claim 11, further comprising a buffer storage receiving the digital information from said first storage media in advance of the user-request of digital information, whereby the digital information in said buffer storage is available for rapid retrieval from said buffer storage.

18. A digital preservation system (DPS) comprising:
   a first storage media for storing digital information arranged in equipment for handling media, the first storage media being a write-once, read-many (WORM) media;
   retrieval upon user-request of digital information from the first storage media;
   retrieval of the digital information from the first storage media and forward copying the digital information to a second WORM storage media;
   a program for monitoring scans of the first storage media to obtain data of the incremental byte errors available for error correction at the time when each scan is made,
   wherein the monitoring scans include a first scan being carried out at startup of the first storage media, and then follow-on scans are conducted at intervals, the spacing of which is determined by evaluation of scan data history, and wherein the analysis of the data of incremental byte errors from the scans versus the time in years is utilized to predict a point in time of the end of life time estimation of the first storage media, where at end of life time estimation of the first storage media there is insufficient residual error correction capacity to correct errors in digital information being retrieved from the first storage media; and,
   a time span is selected, before the point in time of the end of life time estimation, to provide a period in which a second storage media is planned and implemented, in order that there will exist sufficient residual error correction capacity of the first storage media to correct errors in digital information being retrieved from the first storage media for forward copy of the digital information to the second storage media,
   wherein a duplicate file copy on a second medium serves to provide backup in case of an untoward event, fire, damage, physical attack or earthquake; where, for greater physical security of the backup file copies, the backup media can be stored at a site remote from the first site, and where, a duplicate and complete DPS system could be implemented at the remote site using the backup media.

19. A digital preservation system (DPS) comprising:
   a first storage media for storing digital information arranged in equipment for handling media, the first storage media being a write-once, read-many (WORM) media;
   retrieval upon user-request of digital information from the first storage media;
   retrieval of the digital information from the first storage media and forward copying the digital information to a second WORM storage media;
   a program for monitoring scans of the first storage media to obtain data of the incremental byte errors available for error correction at the time when each scan is made,
   wherein the monitoring scans include a first scan being carried out at startup of the first storage media, and then follow-on scans are conducted at intervals, the spacing of which is determined by evaluation of scan data history, and wherein the analysis of the data of incremental byte errors from the scans versus the time in years is utilized to predict a point in time of the end of life time estimation of the first storage media, where at end of life time estimation of the first storage media there is insufficient residual error correction capacity to correct errors in digital information being retrieved from the first storage media; and,
   a time span is selected, before the point in time of the end of life time estimation, to provide a period in which a second storage media is planned and implemented, in order that there will exist sufficient residual error correction capacity of the first storage media to correct errors in digital information being retrieved from the first storage media for forward copy of the digital information to the second storage media,
   where an entity may want an online web presence of some or all of the files of its DPS holdings, in service to the public; and where, in DPS there are individual disc media that may be stored in machinery or in racks on shelving; and where, the retrieval rate from the disc media is slower than the retrieval rate from the hard disc drives arrays of online storage systems, and where there are delay times incurred with physical movement of the disc media into and out of the drives for retrieval, makes the retrieval rate from the digital preservation system slow as compared with the near-instantaneous retrieval rates associated with online web searching; where the entity's DPS can be in parallel with an online digital storage system, where among the files stored on this first parallel online system there are stored a fraction of, or the totality of, the files stored on the DPS, and where the entity's DPS will serve as the source of error-free files needed for backup and restore of the entity's first parallel online system, and as the source of error-free files needed for ingestion to and backup and restore of the entity's successor parallel online systems.

* * * * *